(12) United States Patent
Kimpara

(10) Patent No.: US 12,359,385 B2
(45) Date of Patent: Jul. 15, 2025

(54) FOREIGN MATTER COLLECTING DEVICE

(71) Applicant: SUZUKI MOTOR CORPORATION, Hamamatsu (JP)

(72) Inventor: Masatoshi Kimpara, Hamamatsu (JP)

(73) Assignee: SUZUKI MOTOR CORPORATION, Hamamatsu (JP)

( * ) Notice: Subject to any disclaimer, the term of this patent is extended or adjusted under 35 U.S.C. 154(b) by 561 days.

(21) Appl. No.: 17/709,123

(22) Filed: Mar. 30, 2022

(65) Prior Publication Data

US 2022/0333326 A1 Oct. 20, 2022

(30) Foreign Application Priority Data

Apr. 20, 2021 (JP) ................................. 2021-071177

(51) Int. Cl.
  *E02B 15/10* (2006.01)
  *B01D 27/00* (2006.01)
  *B63B 35/32* (2006.01)

(52) U.S. Cl.
  CPC .............. *E02B 15/10* (2013.01); *B01D 27/00* (2013.01); *B63B 35/32* (2013.01)

(58) Field of Classification Search
  CPC ......... E02B 15/10; E02B 15/04; B01D 27/00; B01D 29/27; B63B 35/32; Y02A 20/204; B63H 20/00
  USPC ....... 210/111, 282, 251, 447, 470, 455, 459, 210/463, 435, 171, 136
  See application file for complete search history.

(56) References Cited

U.S. PATENT DOCUMENTS

| | | | |
|---|---|---|---|
| 2013/0213899 A1* | 8/2013 | Fahs, II | .................... C02F 1/36 |
| | | | 210/542 |
| 2015/0224426 A1* | 8/2015 | Ueyama | ................. B01D 33/42 |
| | | | 210/106 |
| 2021/0001970 A1 | 1/2021 | Ito | |

FOREIGN PATENT DOCUMENTS

| | | |
|---|---|---|
| JP | A S 57-060900 | 9/1982 |
| JP | S61-184198 A | 8/1986 |
| JP | A H 02-147398 | 12/1990 |
| JP | 2021-008199 A | 1/2021 |

OTHER PUBLICATIONS

Notice of Reasons for Refusal dated Sep. 3, 2024, issued by the Japanese Patent Office in corresponding application JP 2021-071177.

* cited by examiner

*Primary Examiner* — Madeline Gonzalez
(74) *Attorney, Agent, or Firm* — Stein IP, LLC

(57) ABSTRACT

A foreign matter collecting device provided at a ship propulsion device that is configured to apply a propulsive force to a ship, the foreign matter collecting device includes an anti-ventilation plate extending in a horizontal direction and a collecting part provided in the anti-ventilation plate. A flow path extending from a water intake port to a water discharge port is provided in the anti-ventilation plate. A filter configured to collect fine-grained foreign matters from a water flow in the flow path is provided in the collecting part.

12 Claims, 9 Drawing Sheets

FOREIGN MATTER COLLECTING DEVICE

CROSS-REFERENCE TO RELATED APPLICATIONS

The disclosure of Japanese Patent Application No. 2021-071177 filed on Apr. 20, 2021, including specification, drawings and claims is incorporated herein by reference in its entirety.

BACKGROUND

The present invention relates to a foreign matter collecting device.

In recent years, pollution of sea, lake, river, and the like due to rubbish has become a serious environmental destruction problem. In particular, pollution by fine plastic pieces called microplastics has attracted attention. Since fine foreign matters such as microplastics have a large influence on organisms in water, it is desired to make an active countermeasure for collecting these foreign matters. For example, there is an outboard motor that takes in cooling water of a power source from water, in which a strainer or the like is provided in a flow path of the cooling water (for example, see Patent Literature 1). In a ship propulsion device disclosed in Patent Literature 1, fine foreign matters that pass through a mesh of the strainer are not collected and are discharged into water.

In addition, there is a foreign matter collecting device retrofitted to a ship propulsion device (for example, see Patent Literature 2). The foreign matter collecting device disclosed in Patent Literature 2 is attached above an anti-ventilation plate of the ship propulsion device. A flow path is formed in a case main body of the foreign matter collecting device from a water intake port on a front surface toward a water discharge port on a rear surface, and a filter that can capture fine foreign matters is disposed in an intermediate portion of the flow path. Water flows into the flow path from the water intake port during traveling, fine foreign matters in the water are removed by the filter, and water is discharged from the water discharge port. The foreign matter collecting device is exposed from the water surface during high-speed traveling, and traveling resistance is reduced.

Patent Literature 1: JP-A-S61-184198
Patent Literature 2: JP-A-2021-008199

SUMMARY

According to an aspect of the present disclosure, there is provided a foreign matter collecting device provided at a ship propulsion device that is configured to apply a propulsive force to a ship, the foreign matter collecting device includes: an anti-ventilation plate extending in a horizontal direction; and a collecting part provided in the anti-ventilation plate, in which a flow path extending from a water intake port to a water discharge port is provided in the anti-ventilation plate, and in which a filter configured to collect fine-grained foreign matters from a water flow in the flow path is provided in the collecting part.

BRIEF DESCRIPTION OF DRAWINGS

Exemplary embodiment(s) of the present invention will be described in detail based on the following figures, wherein.

DETAILED DESCRIPTION OF EXEMPLIFIED EMBODIMENTS

The foreign matter collecting device disclosed in Patent Literature 2 is a large device for a medium or large ship propulsion device, and it is not practical to add such a foreign matter collecting device to a small ship propulsion device. Although the traveling resistance caused by the foreign matter collecting device is reduced during high-speed traveling, there is a problem that the traveling resistance is increased by the foreign matter collecting device during normal traveling.

The present invention has been made in view of the above circumstances, and an object of the present invention is to provide a foreign matter collecting device that can collect fine foreign matters in water without sacrificing power performance of a ship propulsion device.

According to the foreign matter collecting device in one aspect of the present invention, a water flow in a flow path of an anti-ventilation plate passes through a filter, fine-grained foreign matters such as microplastics are removed from the water flow, and a countermeasure for collecting foreign matters is taken during traveling of a ship. Since a collecting part is provided in the anti-ventilation plate, traveling resistance is less likely to increase and power performance of a ship propulsion device is not sacrificed during normal traveling and during high-speed traveling.

A foreign matter collecting device according to an aspect of the present invention is provided at a ship propulsion device that applies a propulsive force to a ship. The foreign matter collecting device includes an anti-ventilation plate extending in a horizontal direction, and a collecting part provided in the anti-ventilation plate. A flow path extending from a water intake port to a water discharge port is formed in the anti-ventilation plate, and a filter that can collect fine-grained foreign matters from a water flow in the flow path is provided in the collecting part. When the water flow in the flow path of the anti-ventilation plate passes through the filter, fine-grained foreign matters such as microplastics are removed from the water flow, and a countermeasure for collecting the foreign matters is taken during traveling of the ship. Since the collecting part is provided in the anti-ventilation plate, traveling resistance is reduced and power performance of the ship propulsion device is not sacrificed during normal traveling and during high-speed traveling.

Embodiment

Figure 1:
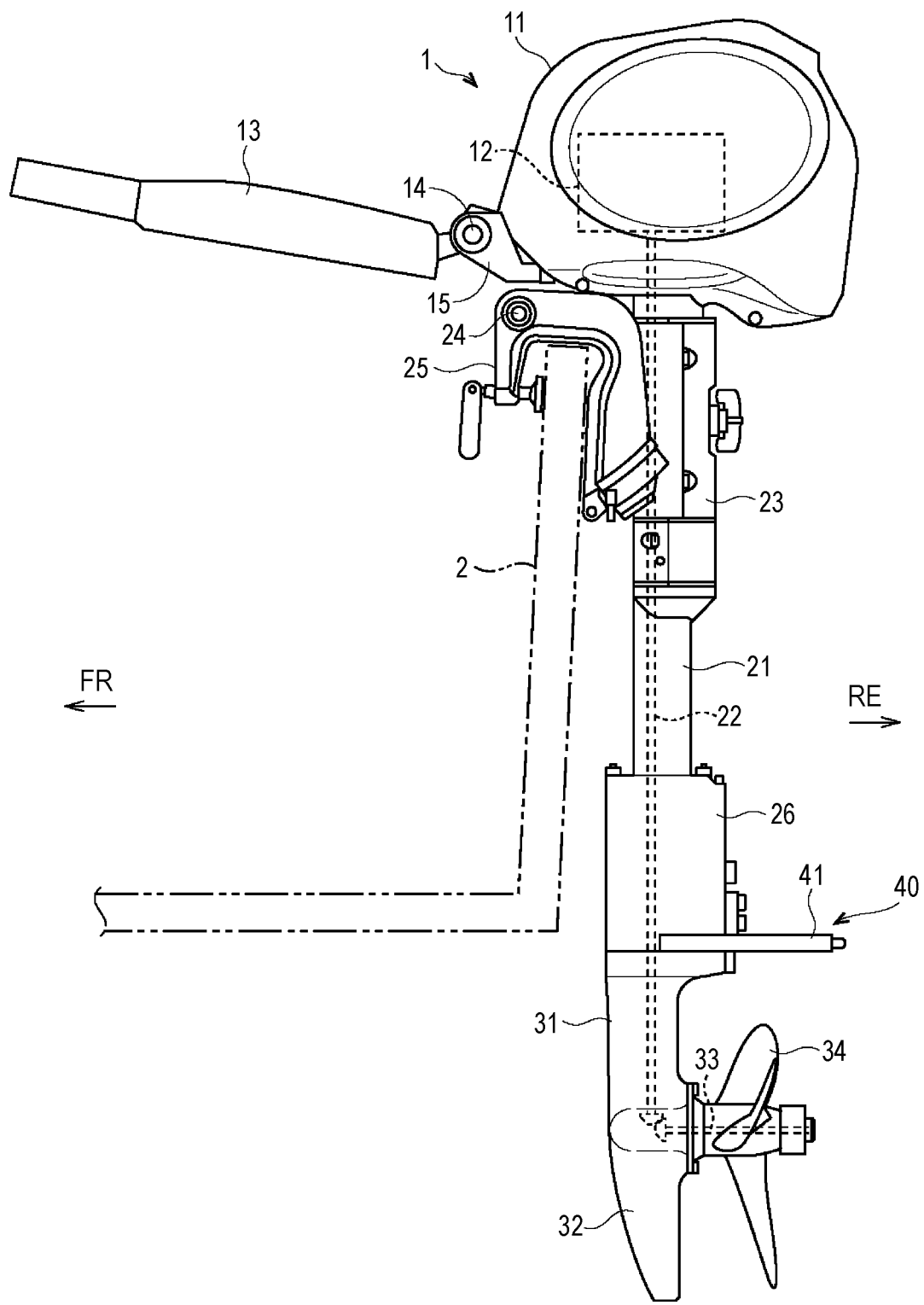
FIG. 1 is a right side view showing an outboard motor according to an embodiment.

Hereinafter, an outboard motor (outboard drive) to which a foreign matter collecting device according to an embodiment is applied will be described with reference to the accompanying drawings. Although an outboard motor is described as an example of a ship propulsion device in the present embodiment, the foreign matter collecting device can also be applied to other ship propulsion devices such as an inboard engine and outboard drive. FIG. 1 is a right side view showing an outboard motor according to the present embodiment. In the following drawings, an arrow FR indicates a forward direction, an arrow RE indicates a rearward direction, an arrow L indicates a left direction, and an arrow R indicates a right direction.

As shown in FIG. 1, an outboard motor 1 is an electric outboard motor using an electric motor 12 as a power source. The outboard motor 1 is attached to a transom board 2 of a stern, and transmits a driving force of the electric motor 12 to a propeller 34 to generate a propulsive force for the ship. A motor cover 11 is provided at an upper portion of the outboard motor 1. The electric motor 12, an inverter (not shown), a pump (not shown), and the like are accommodated inside the motor cover 11. A maneuvering handle 13 is provided at a front side of the motor cover 11. A base end portion of the handle 13 is coupled to an attachment 15 via a handle shaft 14, and the attachment 15 is connected to an upper end portion of a shaft housing 21.

The shaft housing 21 extends downward from the motor cover 11. A drive shaft 22 coupled to the electric motor 12 is accommodated inside the shaft housing 21 in a vertically oriented state. A swivel bracket 23 is provided around an upper half portion of the shaft housing 21, and the shaft housing 21 is rotatably supported by the swivel bracket 23. The swivel bracket 23 is provided with a pair of left and right clamp brackets 25 via a tilt shaft 24. The transom board 2 is clamped by the clamp brackets 25, and the swivel bracket 23 is moved in a tilt direction about the tilt shaft 24.

A heat sink 26 that is wide in a front-rear direction is formed below the shaft housing 21. A cooling water passage for circulating cooling water between the heat sink 26 and the pump in the motor cover 11 is formed in the motor cover 11 and the shaft housing 21. The cooling water warmed in the motor cover 11 passes through the cooling water passage and is cooled by the heat sink 26. A gear case 31 is provided below the heat sink 26. A drive shaft 22 that protrudes downward from the shaft housing 21 is accommodated inside the gear case 31. A skeg 32 that functions as a rectifying plate is formed below the gear case 31.

A propeller shaft 33 coupled to the drive shaft 22 is accommodated in the gear case 31 in a laterally oriented state. The propeller shaft 33 protrudes rearward from the gear case 31, and a propeller 34 is attached to a protruding portion of the propeller shaft 33. When the drive shaft 22 and the propeller shaft 33 are coupled to each other via a bevel gear, the rotation of the drive shaft 22 is converted into the rotation of the propeller shaft 33, and the power of the electric motor 12 is converted into a propulsive force for the ship. An anti-ventilation plate 41 that prevents air from flowing from the water surface into the propeller 34 is provided at the vicinity of a boundary between the gear case 31 and the heat sink 26.

It is desired to collect fine-grained foreign matters such as microplastics from sea, lake, rivers, and the like as an environmental countermeasure. It is possible to provide a foreign matter collecting device retrofitted to the anti-ventilation plate 41, and a user must be entrusted with a processing of retrofitting the foreign matter collecting device to the anti-ventilation plate 41. Adding the collecting device may increase traveling resistance, which may reduce the power performance of the outboard motor 1. Therefore, the outboard motor 1 according to the present embodiment is provided with a foreign matter collecting device 40 in which a foreign matter collecting flow path is formed inside the anti-ventilation plate 41.

Figure 2:
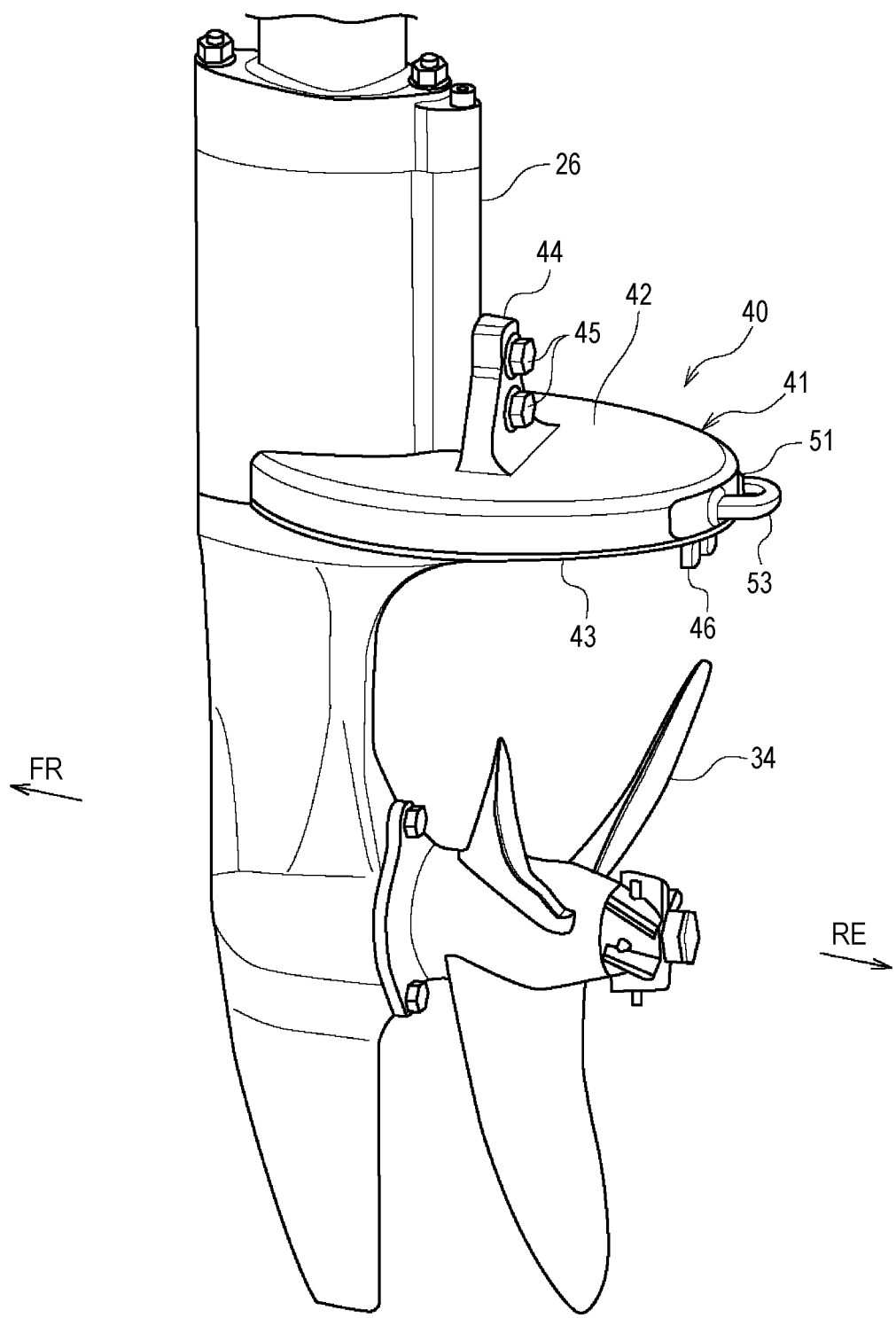
FIG. 2 is a perspective view showing a periphery of a foreign matter collecting device according to the embodiment.
Figure 3A:
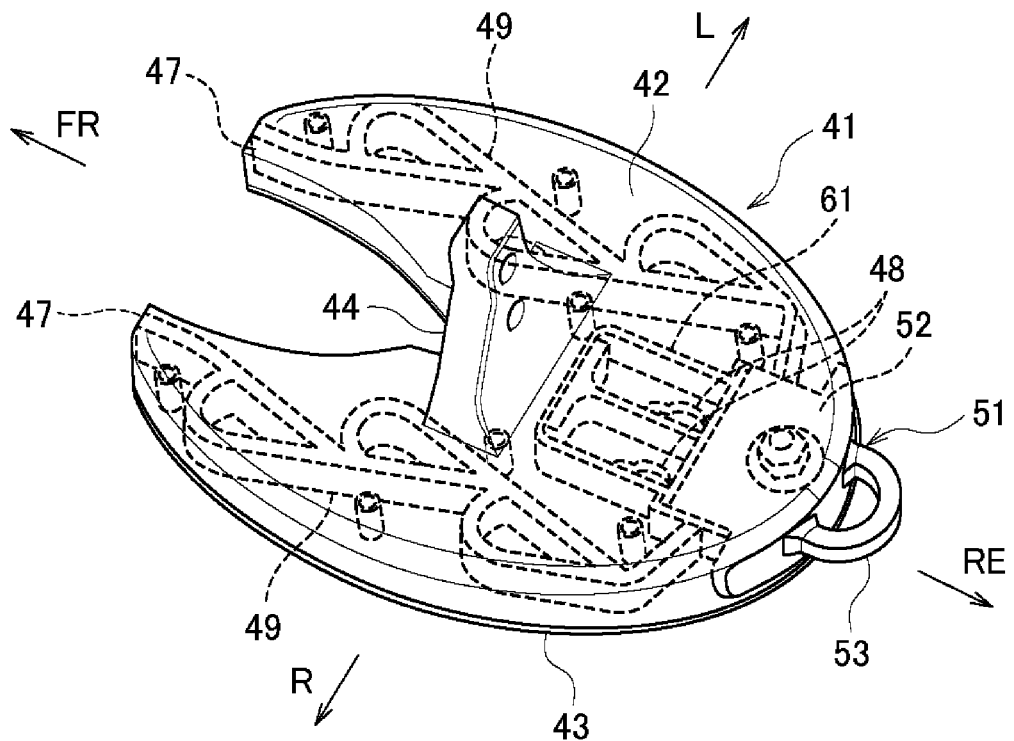
FIGS. 3A and 3B are perspective views showing the foreign matter collecting device according to the embodiment.
Figure 3B:
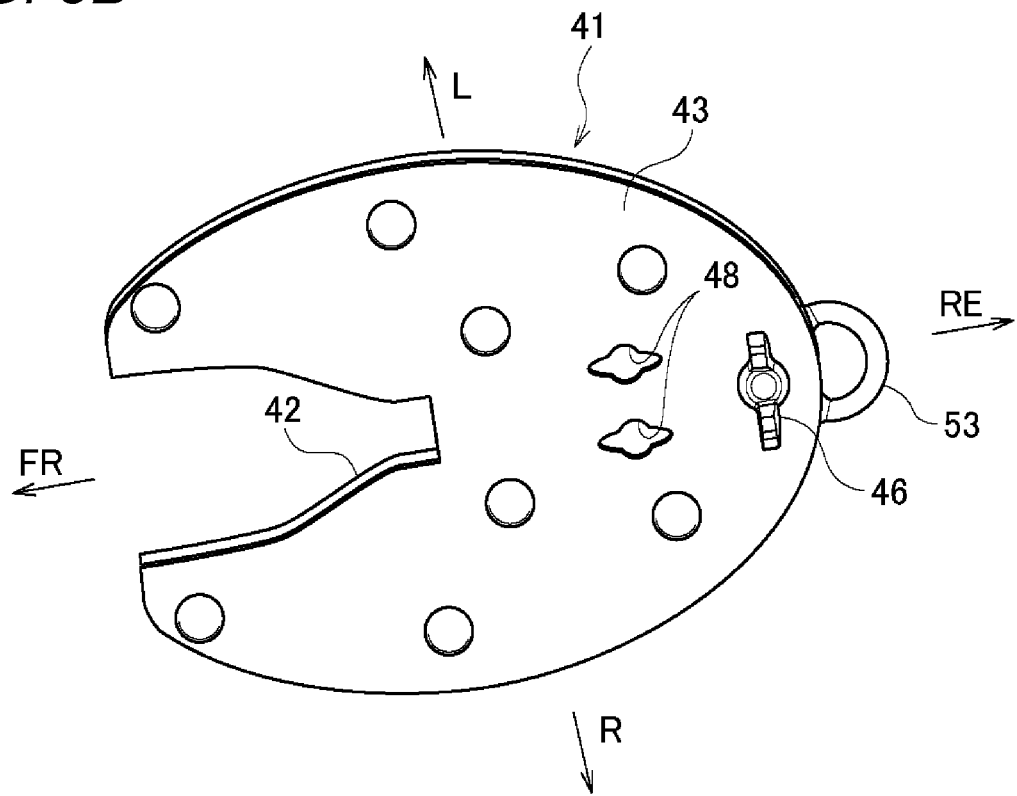
Figure 4:
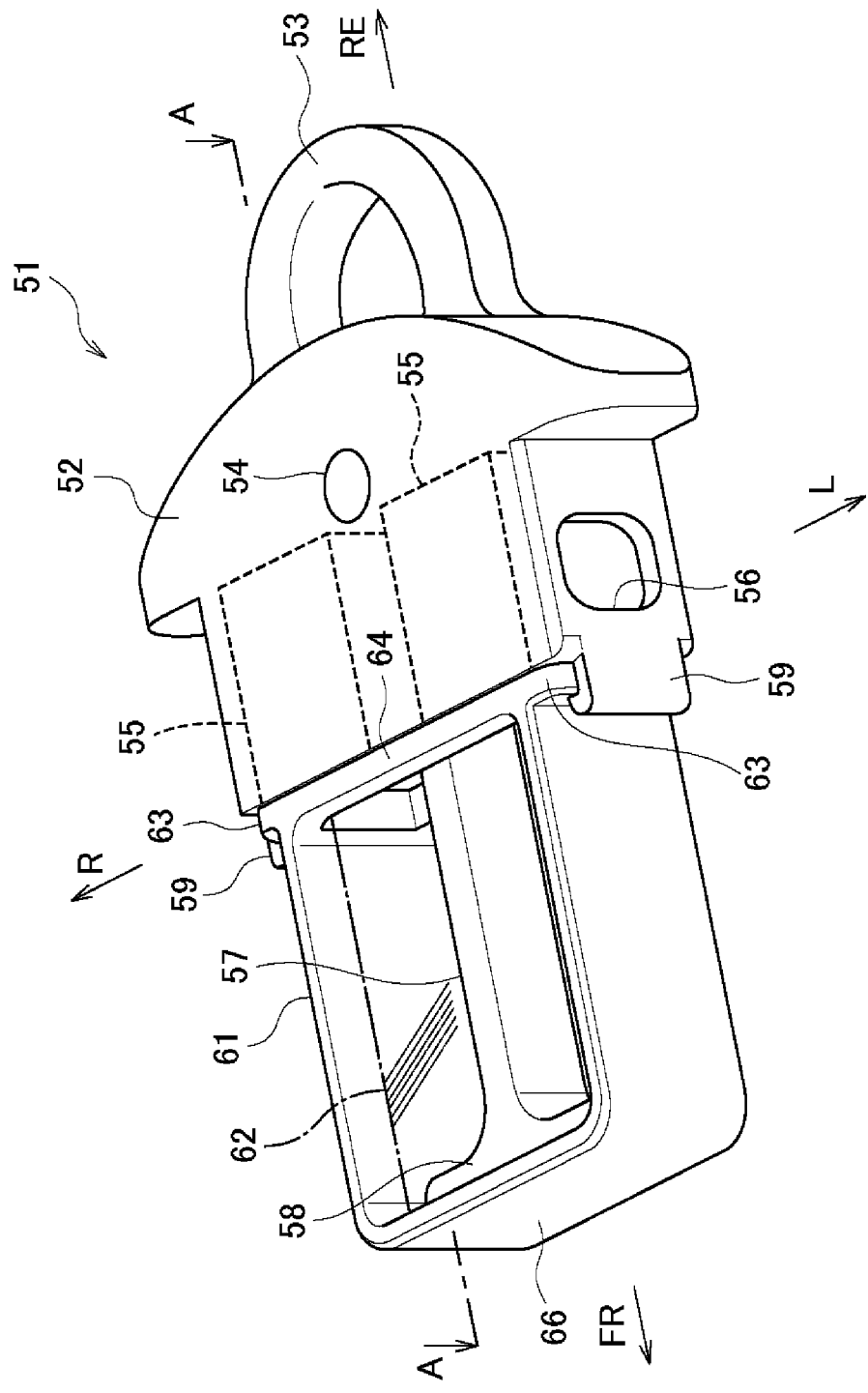
FIG. 4 is a perspective view showing a collecting part according to the embodiment.
Figure 5:
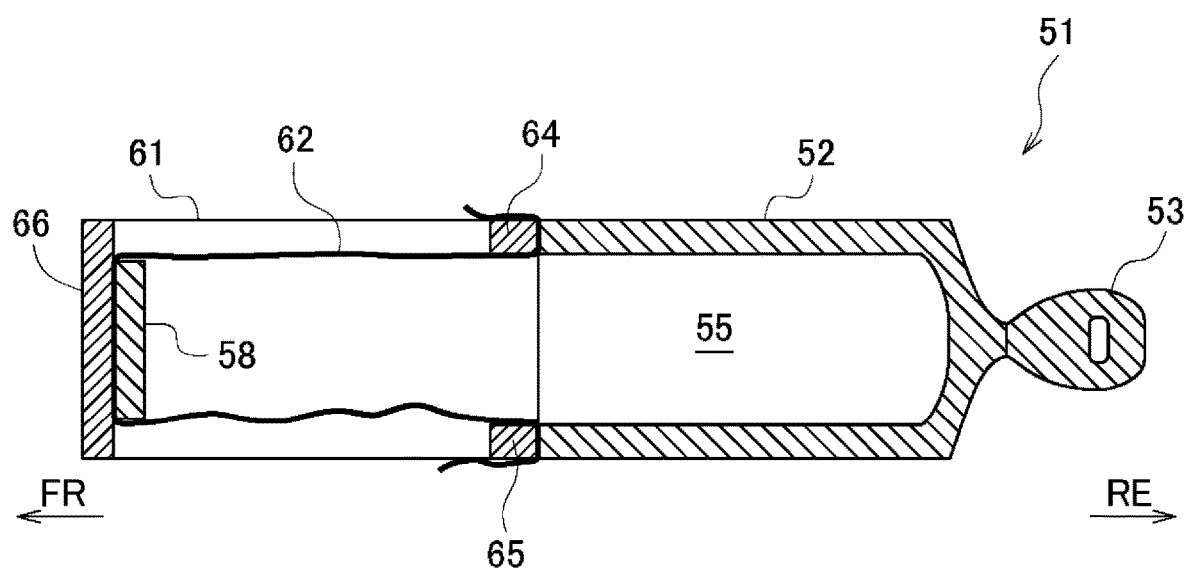
FIG. 5 is a cross-sectional view taken along a line A-A and showing the collecting part in FIG. 4 according to the embodiment.

Hereinafter, a detailed configuration of the foreign matter collecting device will be described with reference to FIGS. 2 to 5. FIG. 2 is a perspective view showing a periphery of the foreign matter collecting device according to the present embodiment. FIGS. 3A and 3B are perspective views showing the foreign matter collecting device according to the present embodiment. FIG. 4 is a perspective view showing a collecting part according to the present embodiment. FIG. 5 is a cross-sectional view taken along a line A-A and showing the collecting part in FIG. 4 according to the present embodiment.

As shown in FIG. 2, the foreign matter collecting device 40 is attached to the heat sink 26. An outer shell of the foreign matter collecting device 40 is formed by the anti-ventilation plate 41. The anti-ventilation plate 41 extends in the horizontal direction from a rear side of an outer peripheral surface of the heat sink 26 so as to cover the propeller 34 from above. A tilt angle of the outboard motor 1 (see FIG. 1) is adjusted so that the anti-ventilation plate 41 is substantially parallel to the water surface during traveling (high-speed traveling) of the ship. The anti-ventilation plate 41 is formed into a substantially elliptical shape in a top view in which a portion of a front side of the anti-ventilation plate 41 is cut out along the outer peripheral surface of the heat sink 26.

The anti-ventilation plate 41 is formed into a flat plate shape having a predetermined thickness (for example, 25 [mm]) and includes a plate case 42 having an open lower surface and a plate cover 43 that covers the lower surface of the plate case 42. Since the anti-ventilation plate 41 is formed into a flat plate shape, an increase in traveling resistance caused by the anti-ventilation plate 41 is prevented. An attachment portion 44 protrudes from an upper surface of the plate cover 43, and the attachment portion 44 is attached to the heat sink 26 by a pair of bolts 45. In this manner, the anti-ventilation plate 41 is detachably attached to the heat sink 26.

A cartridge-type collecting part 51 is attached to a rear portion of the anti-ventilation plate 41. The collecting part 51 is inserted into the anti-ventilation plate 41 from a rear side, and the collecting part 51 is fixed to the plate case 42 by a wing screw 46. An arch-shaped knob 53 is provided on a rear surface of the collecting part 51, and the collecting part 51 is taken out from the anti-ventilation plate 41 by removing the wing screw 46 from the plate cover 43 and pulling out the knob 53. Since the collection part 51 is of a cartridge type, the replacement work of a filter 62 to be described later (see FIG. 4) provided in the collection part 51 is simplified.

As shown in FIGS. 3A and 3B, the plate cover 43 is screwed to the plate case 42 at a plurality of positions. A pair of water intake ports 47 are formed in a front portion of the anti-ventilation plate 41, and a pair of water discharge ports 48 are formed in a rear portion of the anti-ventilation plate 41. More specifically, a front side of the plate case 42 is divided into left and right parts, and the pair of water intake ports 47 are formed in tip ends of the divided parts. The pair of water discharge ports 48 coupled to the collecting part 51 are formed in a rear portion of a lower surface of the anti-ventilation plate 41, that is, in a rear portion of the plate cover 43.

A pair of flow paths 49 extending from the pair of water intake ports 47 to the pair of water discharge ports 48 are formed inside the anti-ventilation plate 41. A backflow prevention structure is formed in each of the flow paths 49 between each of the water intake ports 47 and the collecting part 51. A so-called tesla valve including a plurality of branch flow paths is adopted as the backflow prevention structure in the present embodiment. A flow from each of the water intake ports 47 to each of the water discharge ports 48 is strengthened at a collection point of the branch flow paths, and a flow from each of the water discharge ports 48 to each of the water intake ports 47 is weakened at the collection point of the branch flow paths. A mechanical check valve may be provided in an intermediate portion of a water passage as the backflow prevention structure.

When the ship travels forward, water is taken in from the water intake ports 47, passes through the flow paths 49, and flows from the water intake ports 47 toward the water discharge ports 48. When the ship travels rearward, a backflow from the water discharge ports 48 to the water intake ports 47 is prevented by the backflow prevention structure of the flow path 49. A strainer (not shown) or the like for capturing small stones, algae, and the like is disposed in each of the water intake ports 47. Therefore, foreign matters such as small stones and algae are removed from the water flow in the flow paths 49. Each of the water intake ports 47 may not be provided with the strainer, and each of the water intake ports 47 may be formed with a large number of small holes so that foreign matters that will clog the flow path 49 are not taken in.

As shown in FIGS. 4 and 5, the collecting part 51 is formed into a substantially rectangular shape in a top view so that the collecting part 51 can be pulled out from the anti-ventilation plate 41 (see FIG. 3A). A rear half portion of the collecting part 51 is a collecting part main body 52 attached with the knob 53, and a front half portion of the collecting part 51 is a holder 61 that is formed into a rectangular frame shape in a top view and holds the filter 62. A rear surface of the collecting part main body 52 is formed along an outer peripheral surface of the anti-ventilation plate 41, and the arch-shaped knob 53 protrudes from the rear surface of the collecting part main body 52. A through hole 54 is formed from an upper surface to a lower surface of the collecting part main body 52, and a screw portion of the wing screw 46 (see FIG. 3B) is inserted into the through hole 54.

A pair of cavities 55 that open forward are formed inside the collecting part main body 52. A pair of openings 56 are formed in both side walls of the collecting part main body 52, and each cavity 55 and each flow path 49 (see FIG. 3A) are coupled to each other through each opening 56. A partition wall 57 protrudes forward from the collecting part main body 52, and the partition wall 57 partitions an inner side of the holder 61 into right and left sections. A front wall 58 that is wide in the left-right direction is formed at a tip end of the partition wall 57, and the front wall 58 presses the filter 62 against a front frame 66 of the holder 61. A pair of claw portions 59 of a snap fit type protrude forward from both side walls of the collecting part main body 52, and a pair of protruding portions 63 at a rear end of the holder 61 are hooked by the pair of claw portions 59.

A rear frame of the holder 61 is formed by an upper beam 64 and a lower beam 65, and an inner side of the holder 61 and the pair of cavities 55 of the collecting part main body 52 are coupled to each other through an opening between the upper beam 64 and the lower beam 65. The filter 62 is attached by the holder 61 and the collection part main body 52. Specifically, the filter 62 is interposed between the upper beam 64 of the holder 61 and an upper wall of the collecting part main body 52, between the front frame 66 of the holder 61 and the front wall 58 of the collecting part main body 52, and between the lower beam 65 of the holder 61 and a lower wall of the collecting part main body 52. Therefore, it is possible to replace only the filter 62 from the collection part 51 by removing the holder 61 from the collection part main body 52.

The filter 62 is a filtration member having a multilayer structure with different fineness, and the filter 62 can collect fine-grained foreign matters such as microplastics from a water flow. For example, when a mesh is used as the filter 62, a plurality of meshes having different mesh roughnesses are used in combination. A target size of the foreign matters to be collected by the filter 62 is at least a visually recognizable size (for example, a diameter of 0.1 [mm] or more to a diameter of 0.2 [mm] or less). In this manner, water is taken into the anti-ventilation plate 41 from the water intake ports 47 when the ship travels forward, and fine-grained foreign matters are removed by the filter 62 in the vicinity of the water discharge ports 48.

The foreign matters captured by the filter 62 are taken out from the anti-ventilation plate 41 by replacing the filter 62. The cartridge-type collecting part 51 may be pulled out from the anti-ventilation plate 41 and the filter 62 may be replaced together with the collecting part 51, or the filter 62 may be removed from the collecting part 51 and only the filter 62 may be replaced. Even when the filter 62 is clogged, a flow in each flow path 49 stagnates, an original function of the anti-ventilation plate 41 can be implemented, and there is little influence on traveling performance. Therefore, the filter 62 can be replaced at any timing by a user.

Figure 6A:
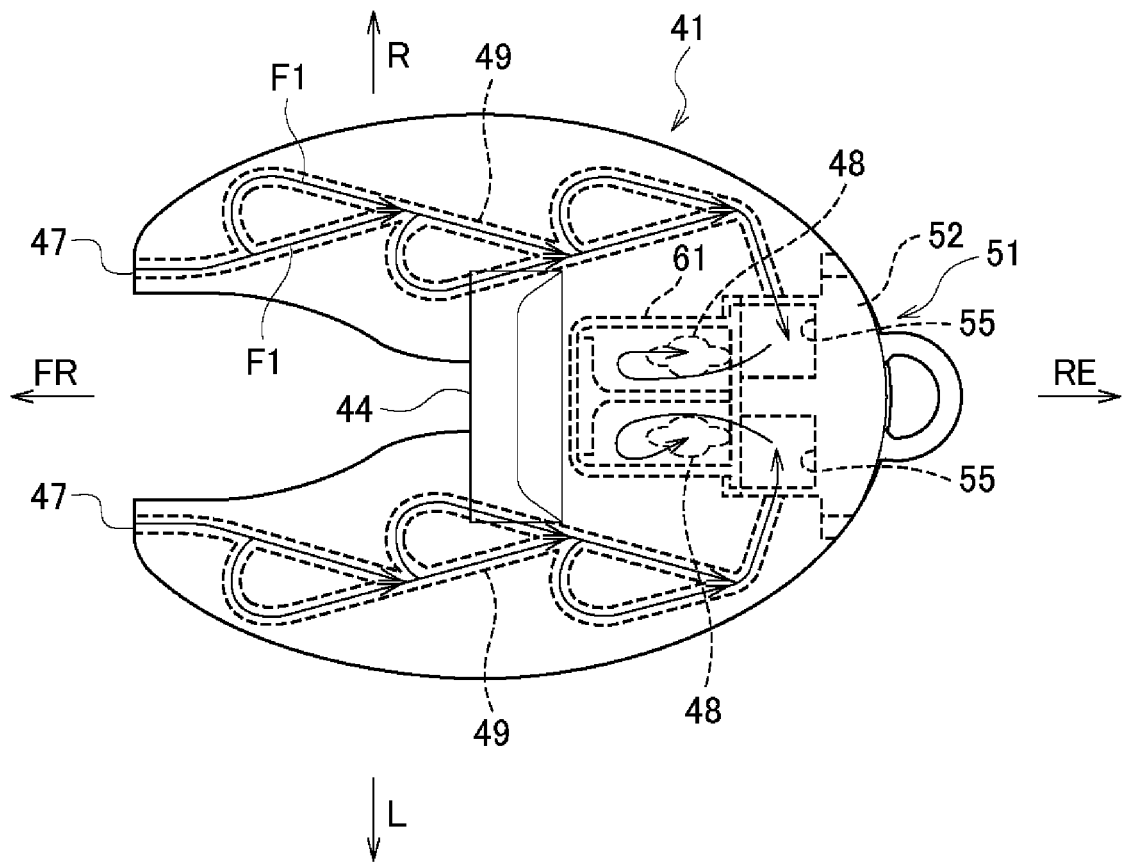
FIGS. 6A and 6B are views showing a water flow when a ship travels forward according to the embodiment.
Figure 6B:
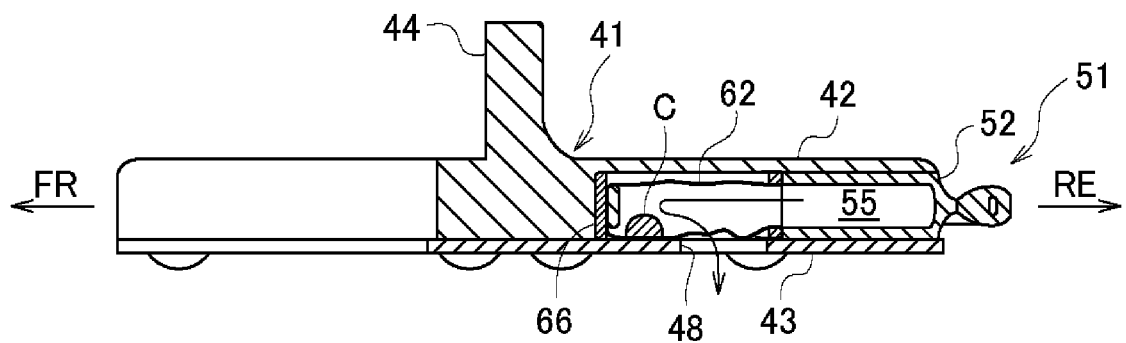
Figure 7A:
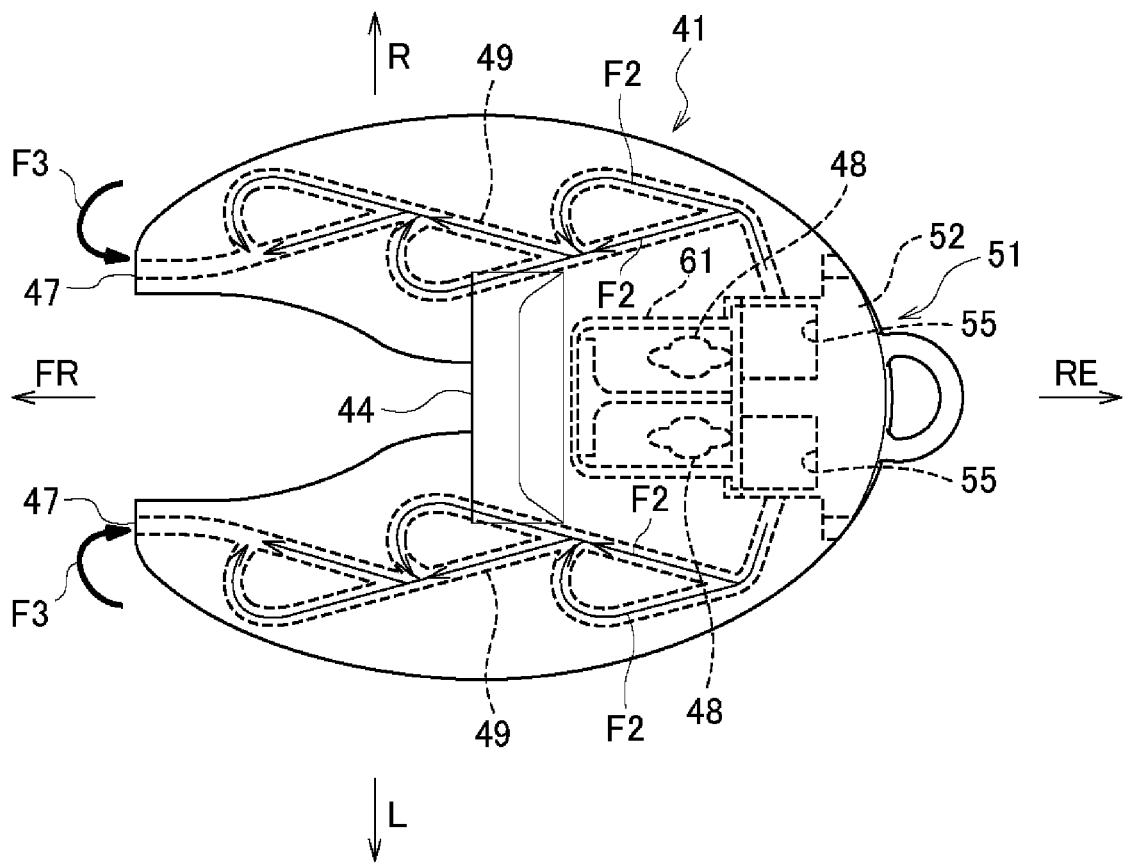
FIGS. 7A and 7B are views showing a water flow when a ship travels rearward according to the embodiment.
Figure 7B:
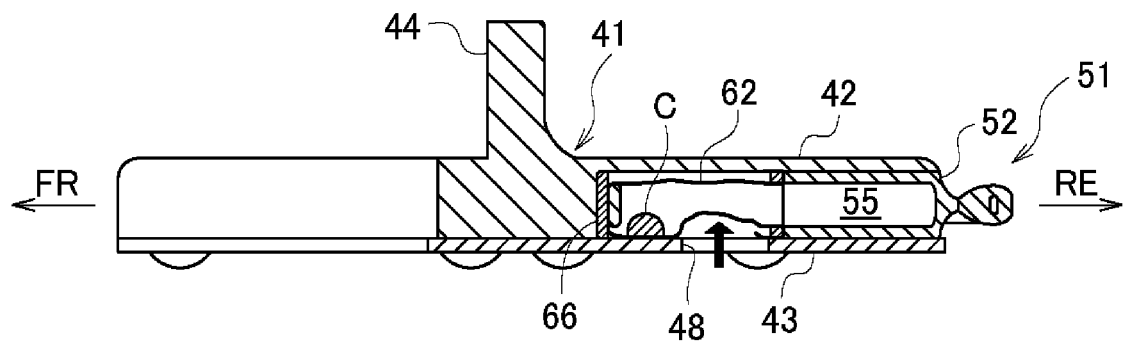

A water flow in the anti-ventilation plate will be described with reference to FIGS. 6A, 6B, 7A, and 7B. FIGS. 6A and 6B are views showing a water flow when a ship travels forward according to the present embodiment. FIGS. 7A and 7B are views showing a water flow when a ship travels rearward according to the present embodiment.

As shown in FIG. 6A, when a ship travels forward, water flows into the pair of flow paths 49 from the pair of water intake ports 47 in a front portion of the anti-ventilation plate 41. At this time, large foreign matters such as small stones are removed by the strainer of each of the water intake ports 47. Water flows from the water intake ports 47 toward the collecting part main body 52 while being repeatedly branched and collected by a plurality of branch flow paths of the flow path 49. The water flow is strengthened at a collection point of the plurality of branch flow paths (a point where a plurality of arrows F1 collect), and the water flows smoothly. Then, the water passes through an inner side of the holder 61 from the cavities 55 of the collecting part main body 52, and is discharged from the water discharge ports 48 on the lower surface of the anti-ventilation plate 41.

As shown in FIG. 6B, water flows into the holder 61 from the cavities 55 of the collecting part main body 52, fine-grained foreign matters C are removed by the filter 62, and water is discharged from the water discharge ports 48. At this time, the foreign matters C are likely to be accumulated in a front half portion of the holder 61 due to the influence of the water flow flowing forward from the cavities 55 of the collecting part 51. Since each water discharge port 48 is located in a rear half portion of the holder 61, the filter 62 is less likely to be clogged by the foreign matters C in the vicinity of the water discharge ports 48. In this manner, water taken in from the water intake ports 47 is filtered by the filter 62, thereby collecting the fine-grained foreign matters C during a normal operation of the ship, and an environmental countermeasure is taken.

As shown in FIG. 7A, when a ship travels rearward, water flows from the collecting part main body 52 toward the water intake ports 47 while being repeatedly branched and collected by the plurality of branch flow paths of the flow path 49. The water flow is weakened at a collection point of the plurality of branch flow paths (a point where a plurality of arrows F2 collect), and a backflow is prevented. Water flowing along the outer peripheral surface of the anti-ventilation plate 41 is separated at a front side of the anti-ventilation plate 41, and a wake flow F3 such as a Karman vortex is generated. The wake flow F3 prevents water from being discharged from the water intake ports 47, and a backflow in the flow path 49 is prevented.

As shown in FIG. 7B, since the water discharge ports 48 are formed in the lower surface of the anti-ventilation plate 41, a direction of the water flow when the ship travels rearward and a direction of each of the water discharge ports 48 intersect with each other, and water is less likely to flow in from the water discharge ports 48. Even when the water flows backward in the vicinity of the water discharge ports 48 and the water pressure acts on the filter 62, the foreign matters C accumulated in the front half portion of the holder 61 are confined by upward swelling of the filter 62. In this manner, the filter 62 is held in the holder 61 with some looseness. Since the backflow from the water discharge ports 48 to the water intake ports 47 is prevented, the foreign matters C are less likely to flow out from the filter 62.

As described above, according to the present embodiment, since the water flow in the flow path 49 of the anti-ventilation plate 41 passes through the filter 62, the fine-grained foreign matters such as microplastics are removed from the water flow, and a countermeasure for collecting the foreign matters is taken during traveling of the ship. Since the collecting part 51 is provided in the anti-ventilation plate 41, the traveling resistance does not increase and the power performance of the outboard motor 1 is not sacrificed during normal traveling and during high-speed traveling.

Figure 8:
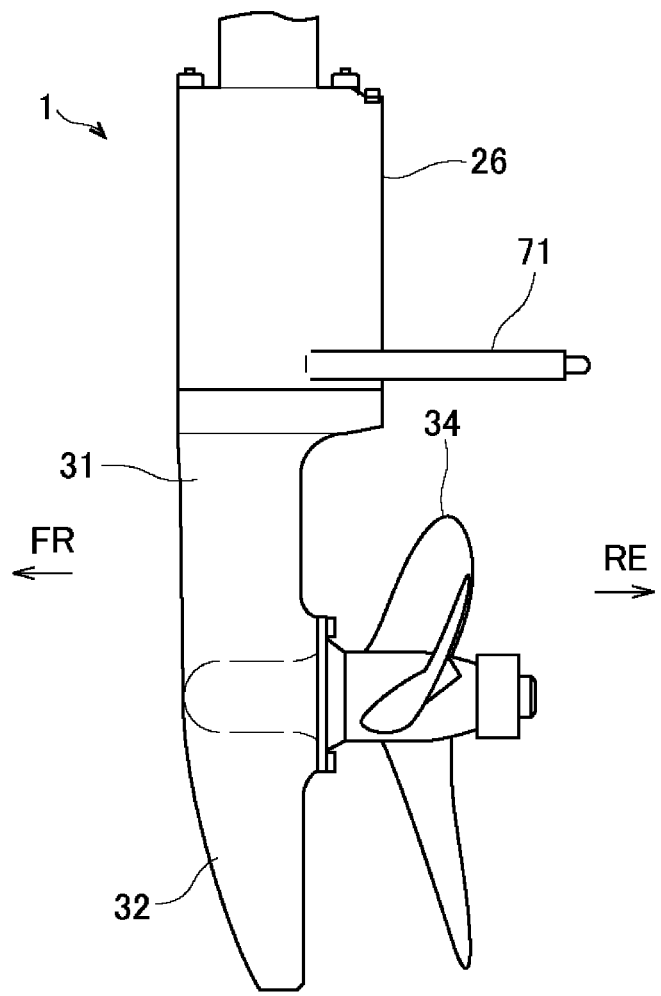
FIG. 8 is a right side view showing a periphery of a foreign matter collecting device of an outboard motor according to a modification.

Although the anti-ventilation plate is detachably attached to the outboard motor in the present embodiment, an anti-ventilation plate 71 may be integrally provided at the outboard motor 1 as shown in FIG. 8. Accordingly, the attachment work of the anti-ventilation plate 71 can be omitted.

Figure 9:
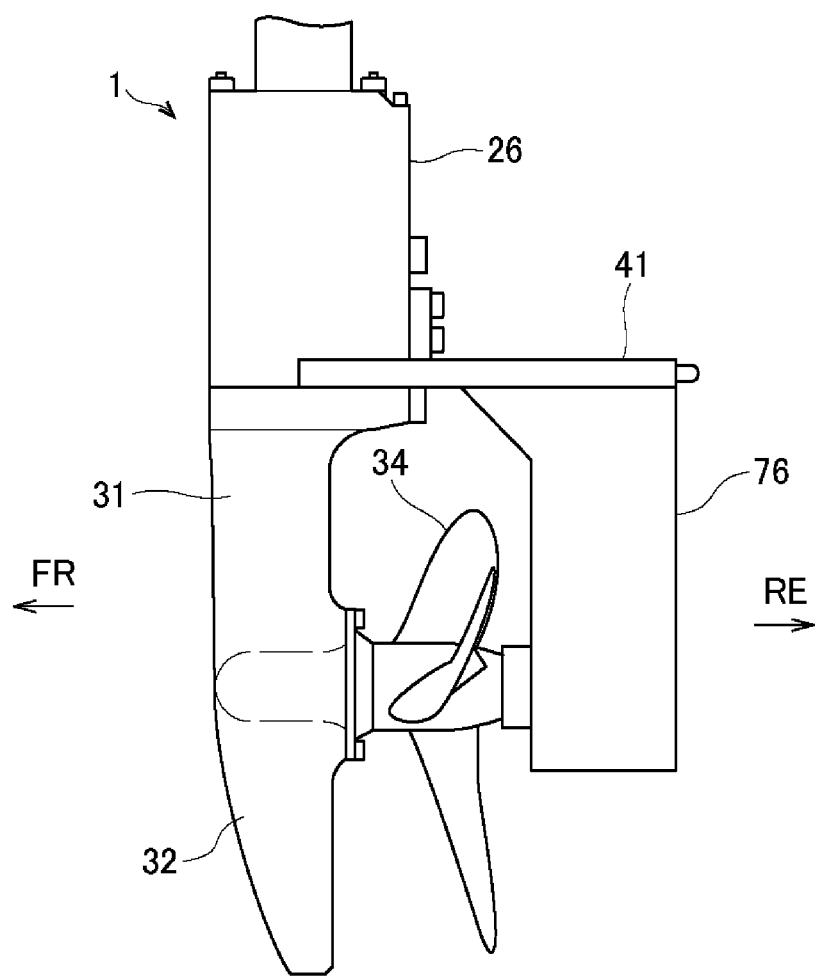
FIG. 9 is a right side view showing a periphery of a foreign matter collecting device of an outboard motor according to another modification.

Although a rectifying device is not provided in the anti-ventilation plate in the present embodiment, a course keeper 76 may be detachably provided as the rectifying device in the anti-ventilation plate 41 as shown in FIG. 9. A stabilizer or a propeller guard may be provided as the rectifying device. As a result, it is possible to facilitate the attachment work of the rectifying device and simplify the maintenance of the rectifying device.

In the present embodiment, since the anti-ventilation plate is detachably attached to the outboard motor, anti-ventilation plates having different front-rear lengths may be properly used for a single propeller and a dual propeller (contra-rotating propeller). Accordingly, the single propeller and the dual propeller can also serve as a gear case and a heat sink. Since the anti-ventilation plate is manufactured as a separate body, the size of a mold is not large at the time of manufacturing the gear case and the heat sink.

Although the anti-ventilation plate is attached to the heat sink of the outboard motor in the present embodiment, the attachment position of the anti-ventilation plate is not particularly limited. For example, the anti-ventilation plate may be attached to the gear case of the outboard motor.

Although the anti-ventilation plate extends in the horizontal direction from the heat sink in the present embodiment, the horizontal direction is not limited to a direction completely orthogonal to the vertical direction, and includes a direction slightly inclined to an extent that the anti-ventilation plate can be regarded as substantially orthogonal to the vertical direction.

Although the anti-ventilation plate is formed into a flat plate shape in the present embodiment, the shape of the anti-ventilation plate is not particularly limited as long as the anti-ventilation plate can implement an anti-ventilation function.

Although an object of the present invention to remove foreign matters such as microplastics in the present embodiment, aquaculture farmers can use the filter to effectively remove leftover feed and the like other than microplastics to contribute to the prevention of ocean pollution.

The anti-ventilation plate may be referred to as a ventilation plate, an anti-cavitation plate, or a cavitation plate.

Although the collecting part is formed into a cartridge type in the present embodiment, the collecting part is not limited to the cartridge type. Only the filter may be replaceable from the collecting part.

Although a filter having a multilayer structure is used in the present embodiment, a filter having a single layer structure may be used as long as the filter can capture fine-grained foreign matters.

Although a backflow prevention structure is formed in the flow path in the present embodiment, the backflow prevention structure may not be formed in the flow path. A backflow can also be prevented by a wake flow such as a Karman vortex, a position of a water discharge port, or the like.

Although the filter is provided at the vicinity of the water discharge port in the present embodiment, the filter may be provided at any position as long as the filter is provided between the water intake port and the water discharge port.

As described above, the foreign matter collecting device (40) according to the present embodiment is a foreign matter collecting device provided at a ship propulsion device (outboard motor 1) that applies a propulsive force to a ship. The foreign matter collecting device (40) includes the anti-ventilation plate (41) extending in a horizontal direction and the collecting part (51) provided in the anti-ventilation plate. The flow path (49) extending from the water intake port (47) to the water discharge port (48) is formed in the anti-ventilation plate, and the filter (62) that can collect fine-grained foreign matters from a water flow in the flow path is provided in the collecting part. According to this configuration, since the water flow in the flow path of the anti-ventilation plate passes through the filter, the fine-grained foreign matters such as microplastics are removed from the water flow, and a countermeasure for collecting the foreign matters is taken during traveling of the ship. Since the collecting part is provided in the anti-ventilation plate, traveling resistance does not increase and power performance of the ship propulsion device is not sacrificed during normal traveling and during high-speed traveling.

In the foreign matter collecting device according to the present embodiment, the collecting part is provided at a rear portion of the anti-ventilation plate, the water intake port is formed in a front portion of the anti-ventilation plate, and the water discharge port coupled to the collecting part is formed in a rear portion of the anti-ventilation plate. According to this configuration, water can be taken into the anti-ventilation plate from the water intake port when the ship travels forward, and fine-grained foreign matters can be removed from the water flow in the vicinity of the water discharge port.

In the foreign matter collecting device according to the present embodiment, the anti-ventilation plate is formed into a flat plate shape. According to this configuration, it is possible to prevent an increase in traveling resistance caused by the anti-ventilation plate.

In the foreign matter collecting device according to the present embodiment, a backflow prevention structure is formed in the flow path of the anti-ventilation plate between the water intake port and the collecting part. According to this configuration, a backflow from the water discharge port to the water intake port is prevented by the backflow prevention structure of the flow path when the ship travels rearward.

In the foreign matter collecting device according to the present embodiment, the collecting part is of a cartridge type, and the filter is a filtration member having a multilayer structure with different fineness. According to this configuration, it is possible to effectively remove fine-grained foreign matters from the water flow by the filter. Since the collecting part is of a cartridge type, the replacement work of the filter can be simplified.

In the foreign matter collecting device according to the present embodiment, the anti-ventilation plate is provided integrally with the ship propulsion device. According to this configuration, the attachment work of the anti-ventilation plate can be omitted.

In the foreign matter collecting device according to the present embodiment, the anti-ventilation plate is detachably provided at the ship propulsion device. According to this configuration, a single propeller and a dual propeller can also serve as a gear case and a heat sink. A size of a mold is not large at the time of manufacturing the gear case and the heat sink.

In the foreign matter collecting device according to the present embodiment, the rectifying device (the course keeper 76) is detachably attached to the anti-ventilation plate. According to this configuration, it is possible to facilitate the attachment work of the rectifying device and the maintenance of the rectifying device.

Although the present embodiment has been described, the embodiment and the modification described above may be combined entirely or partially as another embodiment.

The technique of the present invention is not limited to the embodiment described above, and various changes, substitutions, and modifications may be made without departing from the spirit of the technical concept of the present invention. Further, the present invention may be implemented using other methods as long as the technical concept can be implemented by the methods through advance of the technology or other derivative technology. Therefore, the claims cover all embodiments that may be included within the scope of the technical concept.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A foreign matter collecting device provided at a ship propulsion device that is configured to apply a propulsive force to a ship, the foreign matter collecting device comprising:
    an anti-ventilation plate extending in a horizontal direction; and
    a collecting part provided in the anti-ventilation plate,
    wherein a flow path extending from a water intake port to a water discharge port is provided in the anti-ventilation plate,
    wherein a filter configured to collect fine-grained foreign matters from a water flow in the flow path is provided in the collecting part, and
    wherein the anti-ventilation plate is provided integrally with the ship propulsion device.

2. The foreign matter collecting device according to claim 1,
    wherein the collecting part is provided in a rear portion of the anti-ventilation plate, and
    wherein the water intake port is provided at a front portion of the anti-ventilation plate, and the water discharge port coupled to the collecting part is provided at a rear portion of the anti-ventilation plate.

3. The foreign matter collecting device according to claim 1,
    wherein the anti-ventilation plate has a flat plate shape.

4. The foreign matter collecting device according to claim 1,
    wherein a backflow prevention structure is provided in the flow path of the anti-ventilation plate between the water intake port and the collecting part.

5. The foreign matter collecting device according to claim 1,
    wherein the collecting part is of a cartridge type, and the filter is a filtration member having a multilayer structure with different fineness.

6. The foreign matter collecting device according to claim 1,
    wherein a rectifying device is detachably provided in the anti-ventilation plate.

7. A foreign matter collecting device provided at a ship propulsion device that is configured to apply a propulsive force to a ship, the foreign matter collecting device comprising:
    an anti-ventilation plate extending in a horizontal direction; and
    a collecting part provided in the anti-ventilation plate,
    wherein a flow path extending from a water intake port to a water discharge port is provided in the anti-ventilation plate,
    wherein a filter configured to collect fine-grained foreign matters from a water flow in the flow path is provided in the collecting part, and
    wherein the anti-ventilation plate is detachably provided at the ship propulsion device.

8. The foreign matter collecting device according to claim 7,
    wherein the collecting part is provided in a rear portion of the anti-ventilation plate, and wherein the water intake port is provided at a front portion of the anti-ventilation plate, and the water discharge port coupled to the collecting part is provided at a rear portion of the anti-ventilation plate.

9. The foreign matter collecting device according to claim 7,
wherein the anti-ventilation plate has a flat plate shape.

10. The foreign matter collecting device according to claim 7,
wherein a backflow prevention structure is provided in the flow path of the anti-ventilation plate between the water intake port and the collecting part.

11. The foreign matter collecting device according to claim 7,
wherein the collecting part is of a cartridge type, and the filter is a filtration member having a multilayer structure with different fineness.

12. The foreign matter collecting device according to claim 7,
wherein a rectifying device is detachably provided in the anti-ventilation plate.

* * * * *